United States Patent [19]

Heller et al.

[11] 4,443,174

[45] Apr. 17, 1984

[54] PRESSING DEVICE FOR PRODUCING COMPACTS FROM SOURCE MATERIAL IN POWDER FORM, IN PARTICULAR PULVERIZED NUCLEAR REACTOR FUEL

[75] Inventors: Gerhard Heller, Hanau; Manfred Adelmann, Bruchköbel; Wilfried Wendorf, Hammersbach; Wilhelm Königs, Rodenbach, all of Fed. Rep. of Germany

[73] Assignee: Alkem GmbH, Hanau, Fed. Rep. of Germany

[21] Appl. No.: 422,180

[22] Filed: Sep. 23, 1982

[30] Foreign Application Priority Data

Oct. 1, 1981 [DE] Fed. Rep. of Germany ....... 3139150

[51] Int. Cl.³ ........................ B30B 15/30; B29C 3/04; B29C 3/06

[52] U.S. Cl. .................................... 425/147; 425/256; 425/447

[58] Field of Search ............... 425/147, 145, 256, 258, 425/447, 448, 78, 355, 406

[56] References Cited

U.S. PATENT DOCUMENTS

| | | | |
|---|---|---|---|
| 2,839,787 | 6/1958 | Stevens | 425/447 |
| 3,832,107 | 8/1974 | Cox et al. | 425/258 X |
| 4,005,956 | 2/1977 | Inoue | 425/78 |
| 4,147,490 | 4/1979 | Stewart | 425/355 |
| 4,174,938 | 11/1979 | Cellier | 425/406 X |
| 4,338,071 | 7/1982 | Daubenbüchel et al. | 425/147 X |

*Primary Examiner*—J. Howard Flint, Jr.

*Attorney, Agent, or Firm*—Herbert L. Lerner; Laurence A. Greenberg

[57] ABSTRACT

Pressing device for producing compacts from source material in powder form, in particular pulverized nuclear reactor fuel having a die-plate contained in platen and a bore associated with a ram, for receiving source material powder, a filling shoe, and a reservoir for powder connected by a hose to the filling shoe. The device is characterized by a passing wheel in the filling shoe as filling aid means; a tube containing a feedscrew disposed between the reservoir and hose as metering means; the reservoir having a bottom part with a can type place-on part with an opening eccentric to the axis; a coupling part and a cover part are placed on the open part of the can, these parts are also provided with a passageway to the feedscrew eccentric to the longitudinal axis.

7 Claims, 2 Drawing Figures

PRESSING DEVICE FOR PRODUCING COMPACTS FROM SOURCE MATERIAL IN POWDER FORM, IN PARTICULAR PULVERIZED NUCLEAR REACTOR FUEL

BACKGROUND OF THE INVENTION

1. Field of the Invention

The invention relates to a pressing device for producing compacts from source material in powder form, in particular pulverized nuclear reactor fuel. The device has a die-plate contained in a platen and a bore associated with a ram, for receiving source material powder. It also has a filling shoe disposed at a movable arm, which shoe can be displaced over the platen, and applied against the platen, for filling source material powder into the die-plate bore. The filling shoe has an outflow opening directed toward the platen with a filling aid means and is connected by a hose to a reservoir for source material powder provided with a metering means.

2. Description of the Prior Art

Such a pressing device is already on the market. A jolting grid is disposed in the filling shoe of this commercially available pressing device, which as a filling aid means helps to fill the source material powder into the die-plate bore. The reservoir for source material powder is an open hopper with a flat slide as metering means for proportioning the source material powder supplied to the filling shoe.

However, the jolting grid in the filling shoe of this pressing device causes the escape of considerable amounts of source material powder at the seal which the filling shoe has toward the platen. Further, the transfer of source material powder from a storage or transport can into the open hopper causes intense dust formation, which likewise leads to losses of source material powder. Such losses occur, moreover, at the slide with which the open hopper is equipped for metering the source material powder supplied to the filling shoe.

These losses are of particular importance especially when processing pulverized nuclear reactor fuel such as $UO_2$ or $UO_2/PuO_2$ powder, as such fuels are not only very expensive, but also toxic and radioactive.

This is true in particular of plutonium-containing pulverized nuclear reactor fuels, which, to avoid toxic and radioactive load, are handled by operators in so-called glove boxes, the interior of which is sealed dust-proof from the external environment.

Since the commercially available pressing device shows a dust formation and escape of powder at the filling shoe which are too great for the processing of pulverized nuclear fuels, this pressing device, when set up and operated in a glove box, causes considerable cleaning work to be done in this glove box, which work recurs regularly. In the handling of plutonium-containing pulverized nuclear reactor fuels, such dust formation may lead to exposure of the operators to a heavy radiation load.

SUMMARY OF THE INVENTION

An object of the invention is to provide a pressing device which will avoid to a large extent dust formation and powder losses at the pressing device when producing compacts from pulverized source material.

With the foregoing and other objects in view, there is provided in accordance with the invention a pressing device for producing compacts from source material in powder form, in particular pulverized nuclear reactor fuel, comprising a die-plate contained in a platen and having a bore associated with a ram, for receiving source material powder, a filling shoe which is disposed at a movable arm, can be displaced over the platen, and applied against the platen, for filling source material powder into the die-plate bore, an outflow opening in the filling shoe directed toward the platen with a filling aid means, a hose, connecting the filling shoe to a reservoir for source material powder provided with a metering means, the combination therewith of a passing wheel disposed in the outflow opening of the filling shoe as filling aid means, a tube in which is contained a feedscrew coaxial with the tube inserted between the hose and the reservoir as metering means, said reservoir comprising a bottom part with a can type place-on part and with an outflow bore of the can type place-on part leading to the tube with the feedscrew, a coupling part mounted at the opening of the can type place-on part, said coupling part having a passage bore leading to an opening in the can type place-on part and disposed eccentric to the longitudinal axis of the can type place-on part, a cover part associated with the coupling part and located between the bottom part and the coupling part, said cover part having a passage opening eccentric to the longitudinal axis of the can type place-on part, and said coupling part and said cover part rotatable relative to each other about the longitudinal axis of the can type place-on part into a position in which the passage bore in the coupling part, the passage opening in the cover part and the outflow bore in the bottom part are aligned.

Other features which are considered as characteristic for the invention are set forth in the appended claims.

Although the invention is illustrated and described herein as embodied in a pressing device for producing compacts from source material in powder form, in particular pulverized nuclear fuel, it is nevertheless not intended to be limited to the details shown, since various modifications may be made therein without departing from the spirit of the invention and within the scope and range of equivalents of the claims.

BRIEF DRESCRIPTION OF THE DRAWINGS

The invention, however, together with additional objects and advantages thereof will be best understood from the following description when read in connection with the accompanying drawings, in which:

FIG. 1 shows a cutout of a pressing device according to the invention with details partly sectioned in lengthwise direction. As seen in the drawing, the elements of the device are broadly a can-type container for the powder, a coupling with a funnel-shaped interior, a cover part, a bottom part, a horizontal tube containing a coaxial feedscrew, a deformable hose connecting the tube with a filling shoe, a platen with a die-plate having an open bore, and a passing wheel in the shoe.

FIG. 2 shows a detail of FIG. 1 in plan view.

DETAILED DESCRIPTION OF THE INVENTION

Figure 1:
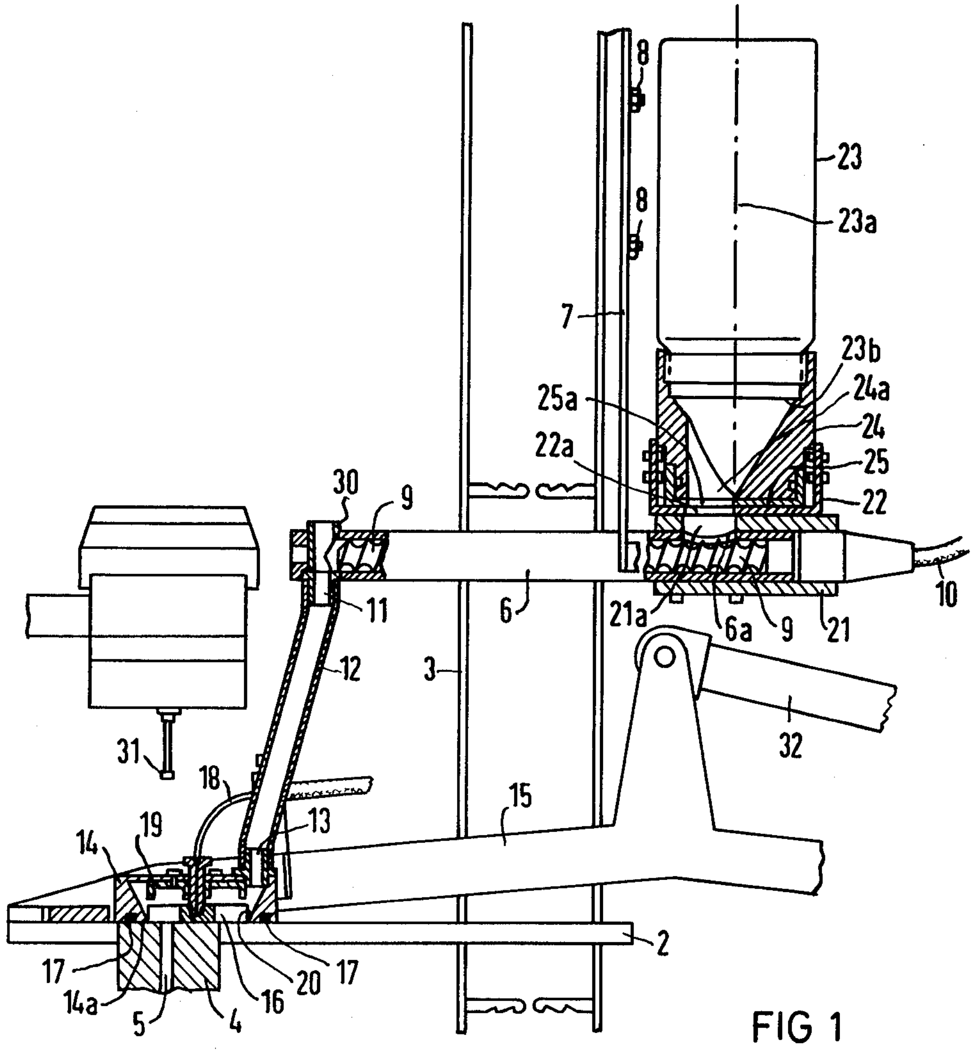

A pressing device of the above-mentioned kind is characterized according to the invention in that a passing wheel is disposed in the outflow opening of the filling shoe as filling aid means, that between the hose and the reservoir a tube as metering means is inserted in which tube is contained a feedscrew coaxial with the tube, that the reservoir comprises a bottom part with a can type place-on part and with an outflow bore arranged eccentrically in the bottom relative to the longitudinal axis of the can type place-on part and leading to the tube with the feedscrew, that at the opening of the can type place-on part a coupling part is mounted which is provided with a passage bore leading to an opening in the can type place-on part and disposed eccentric to the longitudinal axis of the can type place-on part and which coupling part has associated with it a cover part located between the bottom part and the coupling part, the cover part being likewise provided with a passage opening eccentric to the longitudinal axis of the can type place-on part into a position in which the passage bore in the coupling part is aligned with the passage opening in the cover part and with the outflow bore in the bottom part.

The passing wheel may be provided, for example on its circumference, with bristles with which, when rotating, passes the pulverized source material in the outflow opening of the filling shoe into the die-plate bore. Jolting movements in the filling shoe which could lead to the occurrence of losses through escape of pulverized source material between the filling shoe and the platen are thus avoided.

The tube with coaxial feedscrew inserted as metering device between the hose and the reservoir completely covers this coaxial feedscrew and thus also prevents losses of source material powder from occurring at the metering device.

The can type place-on part may be, for example, a hollow-cylindrical transport or storage can for pulverized source material with a screw cover. After removal of the screw cover, the coupling part is screwed to the can and closed with the cover part. Then the can with the coupling and cover part is placed on the bottom part. When the passage bore in the coupling part, the passage opening in the cover part, and the outflow bore in the bottom part have been brought into alignment, source material powder can get from the transport or storage can into the tube with the coaxial feedscrew to this feedscrew without dust formation and hence without loss of source material powder.

This pressing device also has the advantage that the passing wheel can be driven without jolts, so that it is seldom necessary to replace the seal provided at the filling shoe toward the platen. Besides, the passing wheel and its bearings are much less subject to wear than guides for jolting grids, so that with this pressing device time-consuming and expensive repairs, which might be connected with a high radiation load for the operators, are avoided. It is of advantage if the passing wheel is an impeller having an axis of rotation which forms with the plane defined by the outflow opening an angle of 90° or at least approximately 90°. Such an impeller breaks up powder bridges that might form in the outflow opening of the filling shoe on the platen, causing the die-plate bore to be unevenly filled with source material powder.

The invention and its advantages will be explained more specifically in an embodiment with reference to the drawing.

The pressing device according to FIG. 1 comprises a platen 2 and a stand 3. The platen 2 contains a die-plate 4 with an open bore 5 perpendicular to the platen 2. A horizontal tube 6 is mounted on stand 3 through a frame 7 attached with screws 8. Tube 6 contains a coaxial feedscrew 9, which together with tube 6 forms a metering device. One end of feedscrew 9 is connected to a flexible shaft 10 which is coupled with the shaft of an electric motor, not shown.

A shoulder part 30 with a nipple 11 directed vertically downward communicates with the interior of tube 6 at one end of tube 6. On nipple 11 is fitted one end of a deformable hose 12 of polyvinyl chloride. The other end of hose 12 is fitted on a nipple 13 of a filling shoe 14. The filling shoe 14 bears on platen 2 and is connected to a two-part arm 15, which can move the shoe 14 over the platen 2 as shown in FIG. 1. from right to left and from left to right, i.e. forward and back.

The interior of the filling shoe 14 has the form of a truncated cone tapering toward an outflow opening 20 directed to platen 2. The nipple 13 opens into the interior of the filling shoe 14. An impeller 16 as passing wheel is arranged in the outflow opening 20 with an axis of rotation of the impeller which forms an angle of about 90° with the plane defined by the outflow opening 20. The edges of impeller 16 turned toward platen 2 are flat and level and their flat and level contact surfaces 14*a*, by which filling shoe 14 bears on platen 2, lie in the same plane. The outflow opening 20 is enclosed by an annular felt packing 17 which is embedded in the likewise annular contact surface 14*a*. Impeller 16 is connected to a flexible shaft 18, which is coupled with the shaft of an electric motor not shown.

On the other end of tube 6 with the flexible shaft 10 is mounted a sleeve 21, whose cross-section has a rectangular contour. The wall of this sleeve 21 has on the top a lead-through 21*a*, which is aligned with a lead-through 6*a* in the wall of tube 6 leading to the feed spiral of feedscrew 9. At the top of sleeve 21 is seated a bottom portion 22 of a reservoir for source material powder, with a can type place-on part 23. In the bottom of part 22, eccentric to the longitudinal axis 23*a* of place-on part 23, is an outflow bore 22*a* which is aligned with the lead-throughs 21*a* in sleeve 21 and 6*a* in the wall of tube 6.

A hollow-cylindrical coupling part 24 is screwed to the place-on part 23 at the opening 23*b* of the can type place-on part 23. The coupling part 24 tapers internally in funnel form to form a passage bore 24*a* disposed eccentric to the longitudinal axis 23*a* of the can type place-on part 23 and extending to the bottom of the coupling part 24.

Between the coupling part 24 and the bottom part 22 is a pot type cover part 25, likewise having in its bottom a passage opening 25*a* disposed eccentric to the longitudinal axis 23*a* of part 23. Cover part 25 closes bore 24*a* in coupling part 24 as long as the can type place-on part 23 is not placed on bottom part 22.

By appropriate guiding and locking means, such as punctures, axially extending grooves and associated pins in bottom part 22, on cover part 24 and on coupling part 24, the can type place-on part 23 can only be placed on bottom part 22 in such a way that outflow bore 22*a* in bottom part 22 is aligned with passage opening 25*a* in cover 25. The locking means provides that the can type place-on part 23 with the coupling part 24 can only be rotated about the longitudinal axis 23*a* of part 23 relatively to the cover part 25 to the extent that the outflow bore 24*a* in bottom part 24 is aligned with passage opening 25*a* and with outflow bore 22*a* when the coupling part 24 with cover 25 is placed on the bottom part 22.

Above bore 5 in die-plate 4 in platen 2 there is indicated in FIG. 1 an upper ram 31 with which source material powder filled in bore 5 is compacted to a compact.

Figure 2:
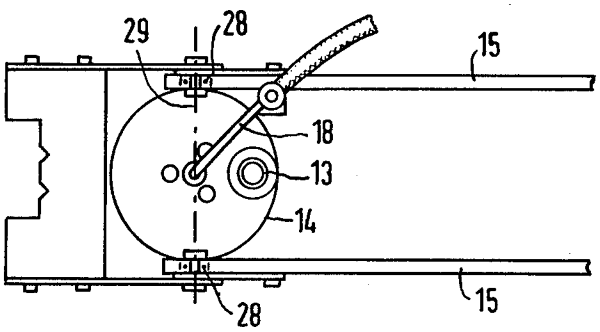

To operate the pressing device according to FIGS. 1 and 2, a can type place-on part 23, containing for example $UO_2/PuO_2$ powder, with an opening 23*b* directed vertically upward, is opened. The coupling part 24 with cover 25 is then screwed tight at the opening 23*b*, the outflow bore 24*a* in coupling part 24 being closed by cover 25.

Then the can type place-on part 23 with opening 23*b* directed vertically downward and with coupling part 24 plus cover 25 is placed on the bottom part 22, so that the passage opening 25*a* in cover 25 is in alignment with the outflow with the outflow bore 22*a* in bottom part 22. By rotation of the can type place-on part 23 with coupling part 24 about the longitudinal axis 23*a* of part 23 with respect to cover 25, the passage bore 24*a* in coupling part 24 is brought into alignment with the passage opening 25*a* in cover 25. This causes the $UO_2/PuO_2$ powder to trickle without loss out of the can type place-on part 23 to feedscrew 9 in tube 6. The feedscrew 9 conveys the powder loss-free to the shoulder part 30. From shoulder part 30 the powder trickles again loss-free through hose 12 into the interior of the filling shoe 14 present above die-plate bore 5, whence it is passed into bore 5 by means of the rotating impeller 16.

Then filling shoe 14 is pushed by arm 15 in FIG. 1 on platen 2 to the right, i.e. to the rear, so that the die-plate bore 5 filled to the upper brim with source material powder is cleared. Thereafter the upper ram 31 is moved into bore 5 and the powder contained in bore 5 is pressed against a lower ram not shown in FIG. 1, with formation of a compact. After return of upper ram 31 to its starting position shown in FIG. 1, by a relative movement between die-plate 4 and lower ram present in bore 5, the compact formed in bore 5 is ejected therefrom onto platen 2, whence it is pushed into a magazine not shown by the filling shoe 14, which in FIG. 1 is again moved from right to left, i.e. from rear to front, on the platen 2. In the end position of this movement from right to left (rear to front), filling shoe 14 is again above die-plate bore 5, which is again filled with $UO_2/PuO_2$ powder.

An especially favorable passing effect is achieved if the vanes on the periphery of impeller 16 form with the plane defined by outlet opening 20 of filling shoe 14 and hence also the plane defined by platen 2, an angle of inlincation which deviates somewhat from 90°.

Advantageously, the filling level of the $UO_2/PuO_2$ powder in the filling shoe 14 is always equally high, so that the powder quantity in die-plate bore 5 is also always the same. It is thereby achieved that the height and weight of all compacts, which are compacted by the upper ram 30 to a uniform density, are always the same. It is therefore of advantage if an electric condenser electrode is arranged in the filling shoe 14. Such an electric condenser electrode is advantageously the metallic bearing 19 of impeller 16 inside the filling shoe 14, which with the metallic platen 2 as counter-electrode forms a capacitive level indicator. This capacitive level indicator may be connected, as sensor, with a control not shown, with which the speed of the electric motor also not shown, which is coupled with the flexible shaft 10 of feedscrew 9, is controlled.

To avoid metallic abrasion, which might get into the source material powder and possibly be a disturbance there, advantageously tube 6 and hose 12 consist of plastic, e.g. polyethylene, while the feedscrew 9 in tube 6 is made of special steel. Also to avoid metallic abrasion and for easier construction of a capacitive level indicator, advantageously the housing of filling shoe 14 is also of plastic, preferably polyethylene.

Filling shoe 14 is pressed against platen 2 pneumatically at constant pressure by a lever 32 articulated to arm 15. Thereby, uniform wear of the felt packing 17 in filling shoe 14 is obtained without any manual readjustment of said packing 17. Advantageously, the filling shoe 14 is mounted for rotation at the movable arm 15 through ball bearings 28 about an axis of rotation 29 crosswise to its displacement direction on platen 2. The filling shoe 14 can thus better follow swinging movements of platen 2, so that during such swinging movements the felt packing 17 in filling shoe 14 hugs the platen 2 and any losses of source material powder passing through this packing 17 are avoided.

The foregoing is a description corresponding to German Application No. P 31 39 150.8, dated Oct. 1, 1981, International priority of which is being claimed for the instant application, and which is hereby made part of this application. Any discrepancies between the foregoing specification and the aforementioned corresponding German application are to be resolved in favor of the latter.

We claim:

1. Pressing device for producing compacts from source material in powder form, in particular pulverized nuclear reactor fuel, comprising a die-plate contained in a platen and having a bore associated with a ram, for receiving source material powder, a filling shoe which is disposed at a movable arm, can be displaced over the platen, and applies against the platen, for filling source material powder into the die-plate bore, an outflow opening in the filling shoe directed toward the platen with a filling aid means, a hose connecting the filling shoe to a reservoir for source material powder provided with a metering means, the combination therewith of a passing wheel disposed in the outflow opening of the filling shoe as filling aid means, a tube in which is contained a feedscrew coaxial with the tube inserted between the hose and the reservoir as metering means, said reservoir comprising a bottom part with a can type place-on part and with an outflow bore of the can type place-on part leading to the tube with the feedscrew, a coupling part mounted at the opening of the can type place-on part, said coupling part having a passage bore leading to an opening in the can place-on part and disposed eccentric to the longitudinal axis of the can type place-on part, a cover part associated with the coupling part and located between the bottom part and the coupling part, said cover part having a passage opening eccentric to the longitudinal axis of the can type place-on part, and said coupling part and said cover part rotatable relative to each other about the longitudinal axis of the can type place-on part into a position in which the passage bore in the coupling part, the passage opening in the cover part and the outflow bore in the bottom part are aligned.

2. Pressing device according to claim 1, wherein the passing wheel is an impeller which has an axis of rotation which forms with the plane defined by the outflow opening an angle of about 90°.

3. Pressing device according to claim 2, wherein the impeller has vanes and the vanes at the periphery of the impeller form with the plane defined by the outflow opening an angle of inclination which deviates from 90°.

4. Pressing device according to claim 1, wherein in the filling shoe is arranged an electric condenser electrode which forms with the platen as counter-electrode a capacitive level indicator.

5. Pressing device according to claim 1, wherein the tube inserted between the hose and the reservoir consists of polyethylene, and the feedscrew in the tube of steel.

6. Pressing device according to claim 1, wherein the external portion of the filling shoe forming the housing consists of polyethylene.

7. Pressing device according to claim 1, wherein the filling shoe is mounted on the movable arm through ball bearings for rotation about an axis of rotation crosswise to its displacement direction.

* * * * *